(12) United States Patent
Bobadilla Fazzini

(10) Patent No.: US 11,319,612 B2
(45) Date of Patent: May 3, 2022

(54) BIOTECHNOLOGICAL PROCEDURE TO REMOVE MAGNETIC SULFUR IMPURITIES FROM IRON CONCENTRATE ORES

(71) Applicant: BIOSIGMA S.A., Santiago (CL)

(72) Inventor: Roberto Andres Bobadilla Fazzini, Santiago (CL)

(73) Assignee: BIOSIGMA S.A., Santiago (CL)

( * ) Notice: Subject to any disclaimer, the term of this patent is extended or adjusted under 35 U.S.C. 154(b) by 435 days.

(21) Appl. No.: 15/755,415

(22) PCT Filed: Aug. 24, 2016

(86) PCT No.: PCT/IB2016/055054
§ 371 (c)(1),
(2) Date: Feb. 26, 2018

(87) PCT Pub. No.: WO2017/033136
PCT Pub. Date: Mar. 2, 2017

(65) Prior Publication Data
US 2018/0251872 A1    Sep. 6, 2018

Related U.S. Application Data

(63) Continuation of application No. 14/836,615, filed on Aug. 26, 2015, now abandoned.

(51) Int. Cl.
*C22B 3/18* (2006.01)
*C22B 1/11* (2006.01)

(52) U.S. Cl.
CPC .................. *C22B 3/18* (2013.01); *C22B 1/11* (2013.01); *Y02P 10/20* (2015.11)

(58) Field of Classification Search
None
See application file for complete search history.

(56) References Cited

U.S. PATENT DOCUMENTS 8,372,628 B2 *  2/2013  Ohata ................. C22B 15/0071
435/282

OTHER PUBLICATIONS

Liu (Biodesulfurization of vanadium-bearing titanomagnetite concentrates and pH control of bioleaching solution) (Year: 2013).*
Martinez (Metabolomic study of Chilean biomining bacteria Acidithiobacillus ferrooxidans strain Wenelen and Acidithiobacillus thiooxidans strain Licanantay) (Year: 2012).*
Xiao-rong Liu, et al; Biodesulfurization of vanadium-bearing titanomagnetic concentrates and pH control . . . ; International Journal of Minerals, Metallurgy and Materials; vol. 20; No. 10; Oct. 2013; pp. 925-930.
P. Martinez, et al; Metabolomic study of Chilean biomining bacteria Acidithiobacillus ferrooxidans strain Wenelen and . . . ; Metabolomics; vol. 9; No. 1; 2013; pp. 247-257.
International Search Report and Written Opinion dated Oct. 27, 2016 for PCT/IB2016/055054.

\* cited by examiner

*Primary Examiner* — Nghi V Nguyen
(74) *Attorney, Agent, or Firm* — Lucas & Mercanti, LLP

(57) ABSTRACT

Present invention describes a biotechnological procedure to remove magnetic sulfur impurities from iron concentrate, wherein includes: to bioleach iron concentrate ores agglomerated in heaps under temperature condition between 5 and 35° C., inoculating the iron concentrate ores with *Acidithiobacillus thiooxidans* cultures, with an inoculum concentration $10^4$ and $10^6$ cel/g and addition of water supplemented with nitrogen and phosphorous source (0.01 to 0.5 g $(NH_4)_2HPO_4$/L), without potassium addition, adjusting pH between 1.0 and 9.0, and a feeding rate between 5 and 15 $L/h/m^2$; this procedure allows a removal efficiency above 80% in 21 days, with a maximum iron loss of 3%.

7 Claims, 2 Drawing Sheets

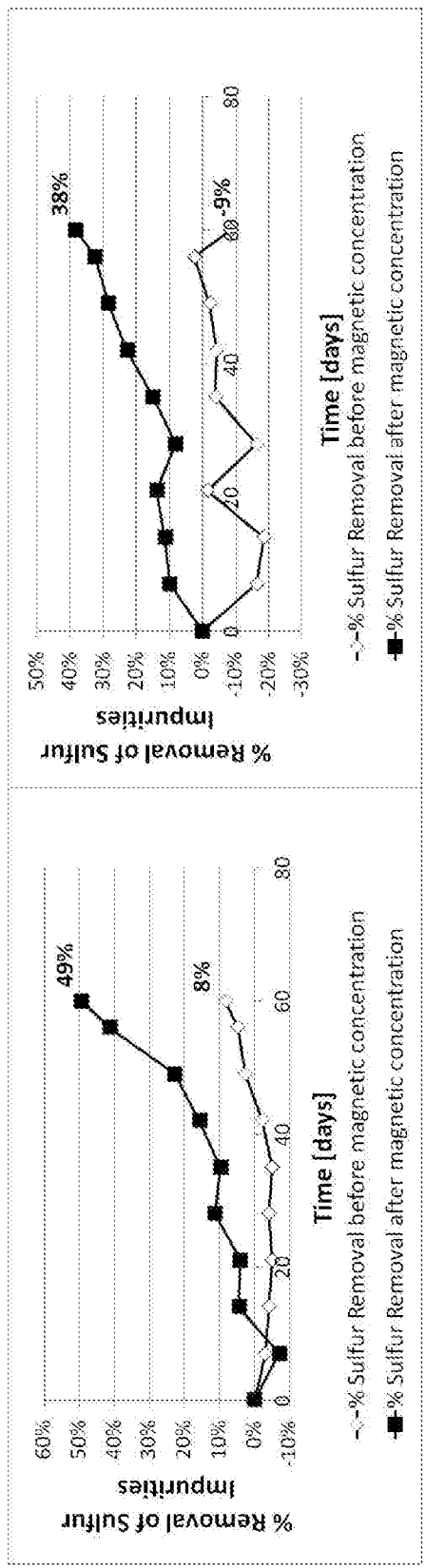
FIG1A
FIG1B
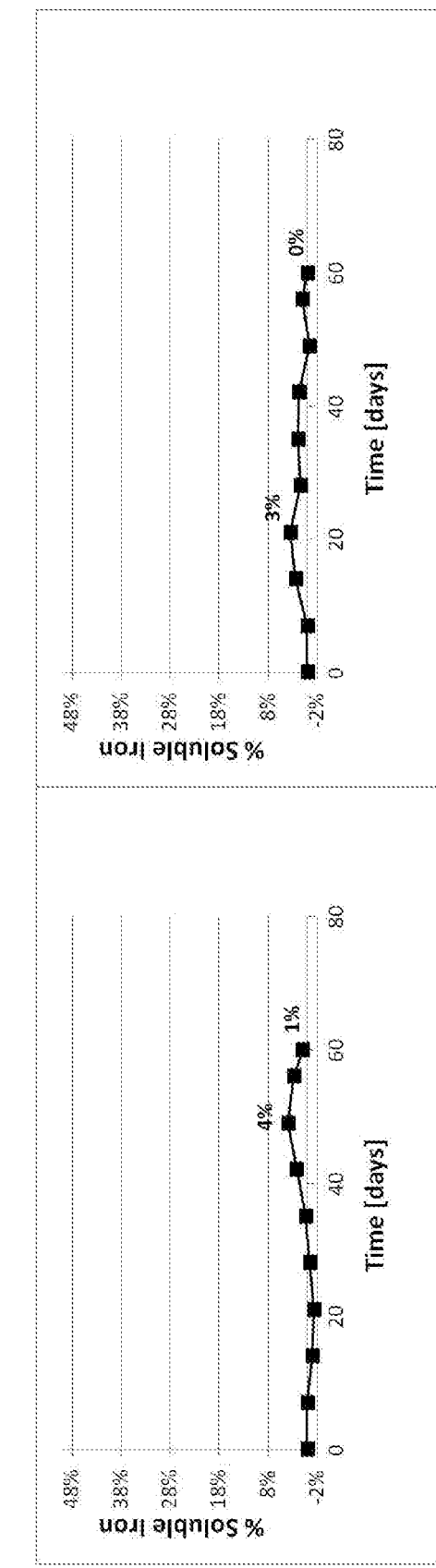
FIG2A
FIG2B

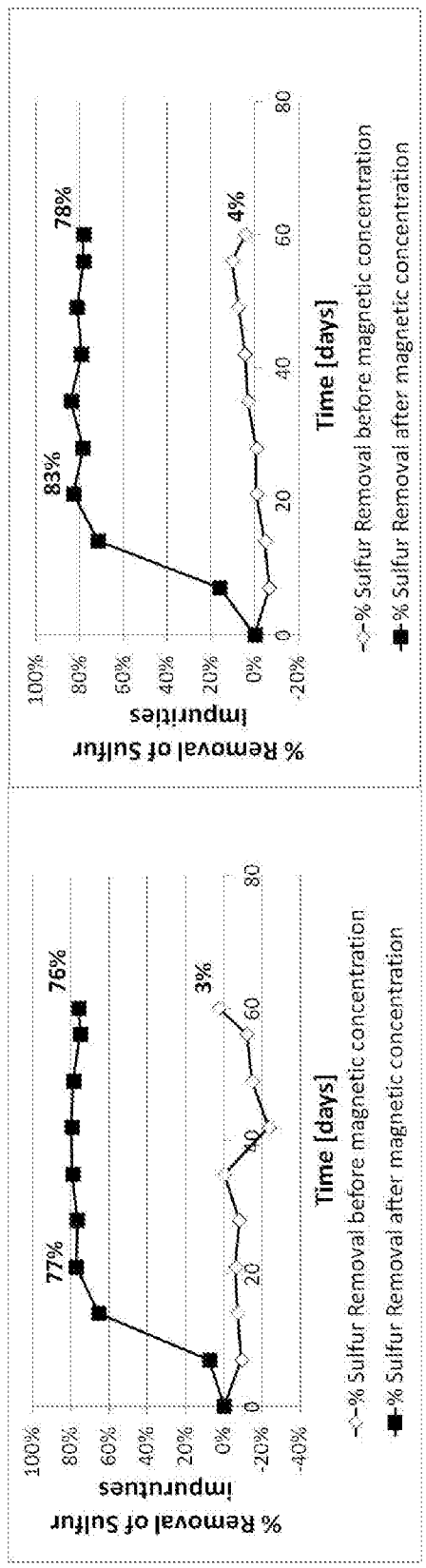
FIG3A
FIG3B
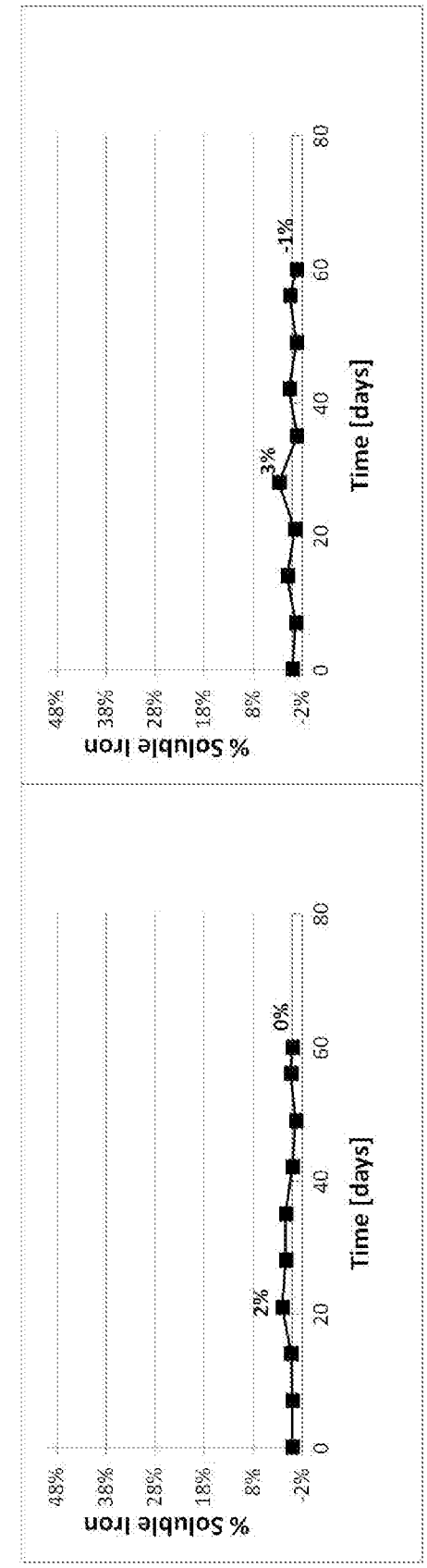
FIG4A
FIG4B

BIOTECHNOLOGICAL PROCEDURE TO REMOVE MAGNETIC SULFUR IMPURITIES FROM IRON CONCENTRATE ORES

CROSS REFERENCE TO RELATED APPLICATION

This Application is a 371 of PCT/IB2016/055054 filed on Aug. 24, 2016, which is a continuation of U.S. application Ser. No. 14/836,615 filed Aug. 26, 2015, both of which are incorporated herein by reference.

BACKGROUND OF THE INVENTION

The current invention is related to the iron production industry. Particularly, with a biotechnological procedure to remove magnetic sulfur impurities that are present on iron concentrate samples, using autotrophic sulfur-oxidizing microorganisms under potassium limiting conditions. Among the sulfur-oxidizing microorganisms, Acidithiobacillus thiooxidans is used, and predominantly the deposited strain DSM 17318, denominated Licanantay, deposited under deposit number DSM 17318 at DSMZ Leibniz Institute DSMZ German Collection of Microorganisms and Cell Cultures, Inhoffenstr. 7B, D-38124 Braunschweig, Germany, on Apr. 11, 2005. Concerning the potassium (K+) limiting conditions, the present invention requires no addition of potassium as nutritional supplement for microbial activity. With respect to magnetic sulfur impurities present on iron concentrates, the use of strain Licanantay without potassium addition, allows impurities oxidation, which after a magnetic concentration stage of the treated iron concentrate, removes such impurities with an efficiency above 80% in 21 days, with a maximum iron loss of 3%.

Based on the described examples it is possible to conclude that the use of strain Licanantay under potassium limiting condition is technically feasible to achieve an efficient removal of magnetic sulfur impurities from iron concentrate.

The production of iron concentrate by means of magnetic concentration and inverse flotation may involve a high content of sulfur, mainly due to Pyrrothite ($Fe_{(1-x)}S$) contamination of secondary concentrate. Depending on the ore characteristics (extraction ore, tailings among others), iron concentrates with a variable content of magnetic sulfur impurities are produced. The presence of such impurities is penalized on iron concentrate sale contracts, where a maximum content tolerated is 0.1% S.

Based on the previous, there is a need for procedures to decrease the content of magnetic sulfur impurities on iron concentrates.

U.S. Pat. No. 4,269,699, describes the use of microorganisms as biosurfactants that selectively adsorb to the ore surface, rendering part of it hydrophilic, which is later mechanically separated from the hydrophobic fraction. However, this method does not mention the oxidation of magnetic sulfur impurities, and therefore it addresses the technical problem in a different way than the present invention.

Patent application US 2005/0084949 describes an air biofilter that reduces the content of sulfur compounds, particularly hydrogen sulfide ($H_2S$). This biofilter uses particles with a hydrophilic nucleus and a hydrophobic coating. The hydrophobic coating includes a metallic agent, and may include microorganisms and nutrients, including phosphorous, nitrogen and potassium. The action of the metallic agent as well as the microorganisms is to that assist in the efficient breakdown of $H_2S$, absorbing the sulfur residue in the biofilter. The metallic agent increases the bio-filtration efficiency. However, this document refers to the decrease of sulfur compounds in an air current, and does not described its use to the removal of magnetic sulfur impurities from iron concentrate.

BRIEF SUMMARY OF THE INVENTION

To solve the stated technical problem, the present invention describes a procedure to remove the magnetic sulfur content from iron concentrate samples, that involves the inoculation of non-sterile cultures of Acidithiobacillus thiooxidans, on iron concentrates with a particle size below 0.15 mm, in such a way to generate, together with the addition of water with pH between 1.0 and 9.0 and without addition of potassium, the ore agglomeration for a further heap leaching treatment under controlled operating conditions.

Among the strains used as inocula, the present invention describes the use of the deposited strain DSM 17318, named Licanantay, which allows a removal with an efficiency above 80%, reaching 0.16% of final sulfur content in 21 days, and more particularly a final sulfur content below 0.1%.

Present invention allows to decrease the percentage of iron loss with respect to the loss due to alternative procedures, which in this case have a maximum of 3%.

According to the magnetic sulfur impurities removal kinetics observed from samples of iron concentrate during the application of strain Licanantay, transformation reactions take place based on the oxidation catalyzed by the sulfur-oxidizing microorganisms, together with precipitation phenomena that occur under the operation conditions. First, the inoculated sulfur-oxidizing microorganisms under potassium limiting condition catalyze the pyrrothite (here represented as FeS) magnetic sulfur impurities oxidation:

$$FeS + 2O_2 \xrightarrow{Licanantay} FeSO_4$$

Practically keeping unaltered the non-magnetic sulfur compounds such as pyrite ($FeS_2$), and selectively reducing the presence of magnetic sulfur impurities on the iron concentrate. Simultaneously, sulfate and/or jarosite precipitation reactions occur:

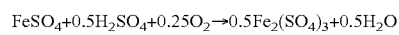
$$FeSO_4 + 0.5H_2SO_4 + 0.25O_2 \rightarrow 0.5Fe_2(SO_4)_3 + 0.5H_2O$$

$$3Fe_2(SO_4)_3 + 14H_2O \rightarrow 2H_3OFe_3(SO_4)_2(OH)_6 + 5H_2SO_4$$

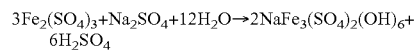
$$3Fe_2(SO_4)_3 + Na_2SO_4 + 12H_2O \rightarrow 2NaFe_3(SO_4)_2(OH)_6 + 6H_2SO_4$$

These reactions are pH dependent and generate precipitates over the iron concentrate surface that need to be mechanically removed via magnetic concentration process, represented by the Davis tube test (Dtt).

BRIEF DESCRIPTION OF THE DRAWINGS

FIG. 1. Figure shows the magnetic sulfur impurities removal kinetics on mini-columns Group I with potassium addition, incubated at pH 3.0 and 30° C. with iron concentrate samples inoculated with strain Licanantay. (-◇-) % Sulfur removal before magnetic concentration; (-■-) % Sulfur removal after magnetic concentration. (A): Iron concentrate sample 1. (B): Iron concentrate sample 2.

FIG. 2. Figure shows the precentage of soluble iron after magnetic concentration on mini-columns Group I with potassium addition, incubated at pH 3.0 and 30° C. with iron concentrate samples inoculated with strain Licanantay. (A): Iron concentrate sample 1. (B): Iron concentrate sample 2.

FIG. 3. Figure shows the magnetic sulfur impurities removal kinetics on mini-columns Group II without potassium addition, incubated at pH 3.0 and 30° C. with iron concentrate samples inoculated with strain Licanantay. (-◇-) % Sulfur removal before magnetic concentration; (-■-) % Sulfur removal after magnetic concentration. (A): Iron concentrate sample 1. (B): Iron concentrate sample 2.

FIG. 4. Figure shows the precentage of soluble iron after magnetic concentration on mini-columns Group II without potassium addition, incubated at pH 3.0 and 30° C. with iron concentrate samples inoculated with strain Licanantay. (A): Iron concentrate sample 1. (B): Iron concentrate sample 2.

DETAILED DESCRIPTION OF THE INVENTION

Present invention discloses a procedure to achieve an efficient removal of magnetic sulfur impurities content from iron concentrate to reach a final sulfur of 0.1%.

The disclosed procedure of the present invention to remove magnetic sulfur impurities includes:
to bioleach iron concentrate ores agglomerated in heaps, under temperature conditions between 5 and 35° C., inoculating the iron concentrates with cultures of *Acidthiobacillus thiooxidans,* with an inoculation concentration of between $10^4$ to $10^6$ cel/g and addition of water supplemented with nitrogen and phosphorous sources (0.01 to 0.5 g $(NH_4)_2HPO_4$/L), without potassium addition, with a pH adjusted between 1.0 to 9.0, and a feeding between 5 and 15 L/h/m$^2$.

EXAMPLES

Iron Concentrate ore Samples Characterization

Two iron concentrate ore samples were used. First sample named "Sample 1" with 28.39% Fe and 1.096% S. Second sample named "Sample 2" with 40.70% Fe and 0.950% S. Besides, a mineralogical analysis was performed to both samples including a liberation analysis. The basic chemical characterization of iron concentrate ore samples is shown in Table 1.

TABLE 1

Chemical characterization of iron concentrate ore samples.

| Sample | Iron % | Sulfur % |
|---|---|---|
| Sample 1 | 28.39 | 1.096 |
| Sample 2 | 40.70 | 0.950 |

A microbiological characterization of the iron concentrate ore samples was done by quantitative PCR (qPCR) based on patented methodologies (U.S. Pat. No. 8,492,093 y U.S. Pat. No. 8,207,324), and is shown in Table 2, indicating the sole presence of heterotrophic species of the genus *Sulfobacillus* in low concentrations. Chemolitoautotrophic sulfur-oxidizing species were not detected.

TABLE 2

Microbiological characterization of iron concentrate ore samples by qPCR.

| Sample | Total bacteria $10^4$ [cel/g] | *A. ferrooxidans* [cel/g] | *A. thiooxidans* [cel/g] | *Leptospirillum* spp. [cel/g] | *Acidiphilium* spp. [cel/g] | *Ferroplasma* spp. [cel/g] | *Sulfobacillus* spp. $10^4$ [cel/g] | Total archaea [cel/g] |
|---|---|---|---|---|---|---|---|---|
| Sample 1 | 8.9 | n.d.* | n.d. | n.d. | n.d. | n.d. | 8.2 | n.d. |
| Sample 2 | 3.6 | n.d. | n.d. | n.d. | n.d. | n.d. | 1.7 | n.d. |

*n.d.: below detection limit.

The mineralogical composition of both iron concentrate ore samples was done using the statistical method of dot counting using an integration plate. The summary of the mineralogical characterization for each sample is given in Table 3.

TABLE 3

Mineralogical distribution of opaque minerals and gangue on iron concentrate ore samples.

| Minerals | Empirical formula | Sample 1 % Weight | Sample 2 % Weight |
|---|---|---|---|
| Chalcopyrite | $CuFeS_2$ | 0.16 | 0.15 |
| Pyrite | $FeS_2$ | 3.21 | 11.05 |
| Pyrrothite | $Fe_{1-x}S$ | 0.58 | 0.80 |
| Magnetite | $Fe_3O_4$ | 40.99 | 41.63 |
| Hematite | $Fe_2O_3$ | 0.13 | 0.24 |
| Limonite | FeOOH | 0.19 | 0.22 |
| Clay | $Al_4(Si_4O_{10})(OH)_3$ | 1.59 | 1.35 |
| Chlorite | $(Mg,Al)_3(AlSi_3O_{10})(OH)_2Mg_3(OH)_6$ | 2.35 | 2.00 |
| Anhydrite | $CaSO_4$ | 0.59 | — |
| Biotite | $K(Mg,Fe)_3(AlSi_3O_{10})(OH,F)_2$ | 2.31 | 2.01 |
| Sericite | $KAl_2(AlSi_3O_{10})(OH)_2$ | 2.36 | 2.02 |
| Plagioclase | $(Ca,Na)(Al,Si)AlSi_2O_8$ | 19.38 | 16.42 |
| Apatite | $Ca_5(PO_4)_3(Cl)$ | 0.20 | 0.16 |
| Calcite | $CaCO_3$ | 0.59 | 0.47 |
| Quartz | $SiO_2$ | 16.51 | 14.10 |
| Tourmaline | $NaMg_3Al_6B_3Si_6O_{27}(OH)_4$ | 3.75 | 3.01 |
| Epidote | $Ca_2Al_2FeSi_3O_{12}(OH)$ | 4.16 | 3.55 |
| Gypsum | $CaSO_4 2H_2O$ | 0.94 | 0.81 |
| Total | | 100.00 | 100.00 |

The mineralogical characterization confirms the presence of pyrrothite as the main magnetic sulfur impurity present on iron concentrate ore samples.

As part of the iron concentrate ore sample mineralogical analysis, a liberation analysis for main minerals was performed, based on a statistical method of free, mineral/gangue associated and mineral/gangue included dot counting, using an integration plate. Results are shown in Table 4.

addition (0.006 g $KH_2PO_4$/L) as part of the feeding solution, while the second group (Group II) was modified without any potassium addition on the feed. The two iron concentrate ore samples were included on both groups. Tables 5 and 6 specify the operating conditions for both groups of columns.

TABLE 4

Liberation Analysis of Main Mineral son Iron Concentrate Ore samples.

| Minerals | Free % | Assoc, to Mgt % | Incl, in Gn % | Assoc to Hem % | Assoc, to Cpy % | Assoc, to Gn % | Assoc, to Py % | Assoc, to Pirr % | Mixed % | Incl, in Mgt % | Gn incl. in % |
|---|---|---|---|---|---|---|---|---|---|---|---|
| Sample 1 | | | | | | | | | | | |
| Cpy | 41.67 | 16.67 | 25.00 | | | | | | | 16.67 | |
| Hem | 66.67 | 33.33 | | | | | | | | | |
| Lim | 44.71 | | | | | | 55.29 | | | | |
| Mgt | 83.35 | | 0.61 | 0.95 | 0.61 | 11.39 | 0.91 | 0.57 | 1.22 | | 0.38 |
| Py | 82.35 | 9.80 | | | 1.96 | | | 5.88 | | | |
| Pyrr | 60.00 | 10.00 | | | | 10.00 | 20.00 | | | | |
| Sample 2 | | | | | | | | | | | |
| Cpy | 59.09 | 18.18 | | | | 18.18 | | | | 4.55 | |
| Hem | 33.33 | 66.67 | | | | | | | | | |
| Lim | 100.00 | | | | | | | | | | |
| Mgt | 81.92 | | 2.05 | 0.35 | 0.34 | 10.82 | 0.34 | | 3.99 | | 0.18 |
| Py | 92.12 | 7.27 | | | | | | 0.61 | | | |
| Pyrr | 84.62 | | | | | | 15.38 | | | | |

Abbreviations: Pyrr: pyrrothite; Py: pyrite; Mgt: magnetite; Hem: hematite; Cpy: chalcopyrite; Lim: limonite; Gn: gangue. Assoc: associated; Incl: included.

Such analysis showed that pyrrothite is mainly free (60 y 85%), and on a lesser extent associated to pyrite and magnetite (20 y 15%), depending on the sample, with no observed pyrrothite fraction included in gangue. This analysis indicates that the magnetic sulfur fraction present in these iron concentrate ore samples is bio-available towards the sulfur-oxidizing activity of strain Licanantay.

Later and once the iron concentrate ore samples were characterized, each sample was inoculated with strain Licanantay DSM 17318, in order to incorporate the sulfur oxidizing autotrophic activity that promotes an optimal oxidation of the magnetic sulfur impurities. The determination of the magnetic sulfur impurities removal kinetics from both iron concentrate ore samples through the application of strain Licanantay was done in column assays, packing 500 g of iron concentrate ore previously agglomerated with water and inoculum at a dose of $10^6$ cel/g, and mixed by rolling over a plastic liner. At the beginning of the leaching cycle, every column was fed at a rate of 5 L/h/m$^2$ with water adjusted to pH 3.0 and addition of 0.5 g $(NH_4)_2HPO_4$/L. Assays were done from 7 up to 60 days with forty columns in total, divided in two groups of twenty columns each. The first group of twenty columns (Group I) included potassium

TABLE 5

Operating conditions for Group I column assays of Removal of Magnetic Sulfur Impurities from Iron Concentrate Ore samples.

| Column | Ore Sample | Inoculation | Feeding Composition | Operation Time [days] |
|---|---|---|---|---|
| 1 | Sample 1 | Strain DSM17318 Licanantay | With nitrogen, phosphorous (0.5 g $(NH_4)_2HPO_4$/L) and potassium addition (0.006 g $KH_2PO_4$/L), incubated at pH 3.0 and 30° C. | 7 |
| 2 | | | | 14 |
| 3 | | | | 21 |
| 4 | | | | 28 |
| 5 | | | | 35 |
| 6 | | | | 42 |
| 7 | | | | 49 |
| 8 | | | | 56 |
| 9 | | | | 60 |
| 10 | | | | 60 |
| 11 | Sample 2 | | | 7 |
| 12 | | | | 14 |
| 13 | | | | 21 |
| 14 | | | | 28 |
| 15 | | | | 35 |
| 16 | | | | 42 |
| 17 | | | | 49 |
| 18 | | | | 56 |
| 19 | | | | 60 |
| 20 | | | | 60 |

TABLE 6

Operating conditions for Group II column assays of Removal of Magnetic Sulfur Impurities from Iron Concentrate Ore samples.

| Column | Ore Sample | Inoculation | Feeding Composition | Operation Time [days] |
|---|---|---|---|---|
| 21 | Sample 1 | Strain | With nitrogen, | 7 |
| 22 | | DSM17318 | phosphorous (0.5 g | 14 |
| 23 | | Licanantay | $(NH_4)_2HPO_4/L)$ | 21 |
| 24 | | | and no | 28 |
| 25 | | | potassium | 35 |
| 26 | | | addition, | 42 |
| 27 | | | incubated at pH | 49 |
| 28 | | | 3.0 and 30° C. | 56 |
| 29 | | | | 60 |
| 30 | | | | 60 |
| 31 | Sample 2 | | | 7 |
| 32 | | | | 14 |
| 33 | | | | 21 |
| 34 | | | | 28 |
| 35 | | | | 35 |
| 36 | | | | 42 |
| 37 | | | | 49 |
| 38 | | | | 56 |
| 39 | | | | 60 |
| 40 | | | | 60 |

To determine the magnetic sulfur impurities removal kinetics through the application of strain Licanantay DSM17318 on both iron concentrate ore samples, with and without potassium addition, columns were drained and discharged at the end of the operation times indicated on Tables 5 and 6. Dry samples of treated ore were analyzed for % Fe y % S before and after the Davis test tube (Dtt) for magnetic concentration.

FIG. 1 shows the magnetic sulfur impurities removal kinetics for Group I columns, with potassium addition. On these assays, based on the % S determination after magnetic concentration, an efficiency of 49 and 38% is observed in 60 days for samples 1 and 2, respectively. On the other hand, FIG. 2 indicates that the loss of iron in solution reached a value of 4% after treatment for this group of columns.

The determination of the magnetic sulfur impurities removal kinetics for columns of Group II under potassium limiting conditions is shown in FIG. 3. In these assays, based on the % S determination after the magnetic concentration test, and efficiency of 77 and 83% was observed in 21 days for iron concentrate ore samples 1 and 2, respectively. These results demonstrate a significantly higher magnetic sulfur impurities removal activity from inoculated Licanantay strain, involving a decrease in total sulfur content from 1.096 to 0.230% for sample 1, and from 0.950 to 0.160% for sample 2, expressed as the total sulfur content after magnetic concentration (Dtt). With respect to the operation conditions of Group II column assays, this nutrient limitation creates a higher energetic requirement for strain Licanantay, which is translated in a higher sulfur-oxidizing activity, and consequently in a significantly higher removal of magnetic sulfur impurities from iron concentrate ore samples. This significantly higher removal doubles the one observed with addition of potassium (Group I columns), and is obtained in a three times shorter time period.

Complementing the previous and as shown on FIG. 4, the loss of iron in Group II columns is negligible since its concentration in solution allows to calculate a maximum iron loss of 3% after treatment, which is below the observation for columns with addition of potassium.

The invention claimed is:

1. A biotechnological procedure to remove magnetic sulfur impurities from iron concentrate ore, comprising:
    inoculating bioleach iron concentrate ore agglomerated on heaps, under temperature conditions between 5 and 35° C. with *Acidithiobacillus thiooxidans* culture, with an inoculum concentration between $10^4$ and $10^6$ cel/g; and
    adding water supplemented with nitrogen and a phosphorous source, without potassium addition, adjusting pH between 1.0 and 9.0, and a feeding rate between 5 and 15 $L/h/m^2$.
    wherein the chemical composition of the iron concentrate ore consists essentially of chalcopyrite, pyrite, pyrrothite, magnetite, hematite, limonite, clay, chlorite, anhydrite, biotite, sericite, plagioclase, apatite, calcite, quartz, tourmaline, epidote and gypsum, and
    wherein the culture is the deposited strain DSM 17318, denominated Licanantay.

2. The biotechnological procedure according to claim 1, wherein the iron concentrate ores have a particle size below 0.15 mm.

3. The biotechnological procedure according to claim 1, wherein the phosphorous source concentration is 0.01 to 0.5 g $(NH_4)_2HPQ_4/L)$.

4. The biotechnological procedure according to claim 1, wherein the chemical composition of the iron concentrate ore are present in an amount of 0.16% weight chalcopyrite, 3.21% weight pyrite, 0.58% weight pyrrothite, 40.99% weight magnetite, 0.13% weight hematite, 0.19% weight limonite, 1.59% weight clay, 2.35% weight chlorite, 0.59% weight anhydrite, 2.31% weight biotite, 2.36% weight sericite, 19.38% weight plagioclase, 0.20% weight apatite, 0.59% weight calcite, 16.51% weight quartz, 3.75% weight tourmaline, 4.16% weight epidote and 0.94% weight gypsum.

5. The biotechnological procedure according to claim 1, wherein the chemical composition of the iron concentrate ore are present in an amount of 0.15% weight chalcopyrite, 11.05% weight pyrite, 0.80% weight pyrrothite, 41.63% weight magnetite, 0.24% weight hematite, 0.22% weight limonite, 1.35% weight clay, 2.00% weight chlorite, 0.00% weight anhydrite, 2.01% weight biotite, 2.02% weight sericite, 16.42% weight plagioclase, 0.16% weight apatite, 0.47% weight calcite, 14.10% weight quartz, 3.01% weight tourmaline, 3.55% weight epidote and 0.81% weight gypsum.

6. The biotechnological procedure according to claim 1, wherein in the chemical composition of the iron concentrate ore Fe is present 28.39% weight and S is present 1.096% weight.

7. The biotechnological procedure according to claim 1, wherein in the chemical composition of the iron concentrate ore Fe is present 40.70% weight and S is present 0.950% weight.

* * * * *